United States Patent
Francalanci et al.

(10) Patent No.: US 10,619,012 B2
(45) Date of Patent: Apr. 14, 2020

(54) SIMPLIFIED PROCESS FOR THE PRODUCTION OF ACRYLIC FIBERS

(71) Applicant: MONTEFIBRE MAE TECHNOLOGIES S.r.l., Milan (IT)

(72) Inventors: Franco Francalanci, Novara (IT); Massimo Marinetti, Mestre (IT); Roberto Proserpio, Mariano Comense (IT)

(73) Assignee: MONTEFIBRE MAE TECHNOLOGIES S.R.L., Milan (IT)

( * ) Notice: Subject to any disclaimer, the term of this patent is extended or adjusted under 35 U.S.C. 154(b) by 94 days.

(21) Appl. No.: 15/921,198

(22) Filed: Mar. 14, 2018

(65) Prior Publication Data

US 2018/0265648 A1    Sep. 20, 2018

(30) Foreign Application Priority Data

Mar. 16, 2017  (IT) ........................ 102017000029200

(51) Int. Cl.
| | | |
|---|---|---|
| *C08J 3/09* | (2006.01) | |
| *C08F 220/46* | (2006.01) | |
| *D01F 6/18* | (2006.01) | |
| *D01F 1/10* | (2006.01) | |
| *D01F 6/38* | (2006.01) | |
| *D01D 1/02* | (2006.01) | |
| *D02G 1/00* | (2006.01) | |

(52) U.S. Cl.
CPC ............. *C08J 3/097* (2013.01); *C08F 220/46* (2013.01); *D01D 1/02* (2013.01); *D01F 1/10* (2013.01); *D01F 6/18* (2013.01); *D01F 6/38* (2013.01); *C08J 2333/20* (2013.01); *D02G 1/006* (2013.01)

(58) Field of Classification Search
CPC ...... C08J 3/097; C08J 2333/20; C08F 220/46; D01D 1/02; D01F 1/10; D01F 6/18; D01F 6/38; D01F 1/02; D02G 1/006
USPC ........................................................ 524/173
See application file for complete search history.

(56) References Cited

FOREIGN PATENT DOCUMENTS

| | | |
|---|---|---|
| EP | 0079800 A1 | 5/1983 |
| EP | 2894243 A1 | 7/2015 |
| GB | 1098634 A | 1/1968 |

OTHER PUBLICATIONS

Lianjiang Tan et al, "Gel-Spun Polyacrylonitrile Fiber from Pregelled Spinning Solution", Polymer Engineering and SCIE, Brookfield Center, US, vol. 50 No. 7, Jan. 1, 2010, pp. 1290-1294.
Fiocco, Marco, Search Report and Written Opinion, dated Nov. 6, 2017, The Hague, Netherlands.

*Primary Examiner* — Josephine L Chang
(74) *Attorney, Agent, or Firm* — Florek & Endres PLLC

(57) ABSTRACT

A process for the preparation of a homogeneous spinning solution for the production of acrylic fibers, which includes: preparing an aqueous suspension of homopolymer or copolymer of acrylonitrile through the polymerization of monomers in aqueous suspension, removal of the unreacted monomers, filtration and washing of the aqueous suspension, obtaining a filtration cake; dispersing the filtration cake; and evaporating the dispersion of polymer or obtaining the homogeneous spinning solution.

18 Claims, 3 Drawing Sheets

SIMPLIFIED PROCESS FOR THE PRODUCTION OF ACRYLIC FIBERS

The present invention relates to a simplified process for the production of acrylic fibers, in particular a process for the preparation of a spinning solution for the production of acrylic fibers.

More specifically, the present invention falls within the area relating to the production of acrylic fibers, which provides for the preparation of polymers starting from acrylonitrile or copolymers mainly composed of acrylonitrile (90-99% w/w with respect to the total weight of the polymer) and one or more other co-monomers in a quantity generally ranging from 1 to 10% by weight with respect to the total weight of the polymer.

Preferred co-monomers are either neutral vinyl molecules such as methyl acrylate, methyl methacrylate, vinyl acetate, acrylamide and analogues, or molecules bearing one or more acid groups such as acrylic acid, itaconic acid, sulfonated styrenes and analogues, or other co-monomers capable of imparting different physico-chemical characteristics to the material.

The polymers and copolymers thus prepared are then subjected to spinning to produce fibers that are collected in tows, suitable for being subsequently transformed into manufactured articles with different processing techniques, for both textile use and technical use.

Particular types of acrylic fiber are also "precursor" fibers for carbon fiber: these are high-molecular-weight copolymers of acrylonitrile and one or more co-monomers, selected from those described above, in a quantity generally ranging from 1 to 5% by weight with respect to the total weight of the polymer. Carbon fibers are then obtained by suitable thermal treatment of these "precursor" fibers based on polyacrylonitrile.

There are various industrial processes for the preparation of acrylic fibers, which use different polymerization and spinning methods.

The state of the art can be divided and schematized as follows:

A. Batch Processes (Two-Step Processes)

In two-step batch processes, the polymer is generally produced in aqueous suspension, isolated and subsequently dissolved in a suitable solvent to be spun and transformed into fiber, or precursor fiber, in the case of carbon fibers. The solvents most commonly used for the preparation of the spinning solution are: dimethylacetamide (DMCA), dimethylformamide (DMF), an aqueous solution of sodium thiocyanate (NaSCN) and finally, as recently described in patent EP2894243B1, mixtures of dimethylsulfoxide (DMSO) with variable quantities of water.

B. Continuous Processes (One-Step Processes)

In continuous processes, on the contrary, the polymerization takes place in a solvent and the solution thus obtained is directly used in spinning without the intermediate isolation of the polymer. The solvents most commonly used in this processes are: dimethylformamide (DMF), dimethylsulfoxide (DMSO), an aqueous solution of zinc chloride (ZnCl$_2$) and an aqueous solution of sodium thiocyanate (NaSCN).

Batch processes offer significant advantages from a management point of view: the two polymerization and spinning steps are in fact independent and traces of impurities and non-reacted monomers can be easily separated from the polymer by washing and filtration, before the spinning step. Processes of this type are consequently much more widely used in industrial practice for the production of acrylic fibers and represent a substantial proportion of precursor production processes for carbon fibers.

Batch processes provide, industrially, a drying step of the polymer obtained from aqueous suspension polymerization, said drying being carried out using belt or fluidized-bed dryers. The polymer in powder form is then conveyed to silos where it is stored until the moment of use. In order to prepare the spinning solution (dope), the polymer in powder form is intimately mixed with the solvent with modes suitable for obtaining solutions free of lumps and gels. After filtration, the dope is finally sent to the spinning machine. The above process according to the state of the art is schematically described in FIG. 1.

The steps for isolating, drying and transporting the polymer in powder form, as well as the step for preparing the spinning solution, involve complex and expensive equipment that require particular attention in terms of safety, as fine, potentially explosive powders are present in the process. These process steps, moreover, are also extremely disadvantageous from energy point of view due to the presence of drying s, generally operating with hot air or nitrogen, and transporting units of the polymer in powder form.

The objective of the present invention is therefore to find a process for the production of acrylic fibers which overcomes the drawbacks of the processes of the state of the art, reducing the production costs and simplifying the whole preparation process of the spinning solution, in particular using the aqueous suspension polymerization technology, but eliminating the drying step of the polymer, its transportation to storage silos and the subsequent preparation step of the spinning solution starting from powders.

DETAILED DESCRIPTION OF THE INVENTION

The object of the present invention therefore relates to a process for the preparation of a homogeneous spinning solution for the production of acrylic fibers, which comprises:

i) a preparation step of an aqueous suspension of homopolymer or copolymer of acrylonitrile by polymerization of the monomers in aqueous suspension, removal of the unreacted monomers, filtration and washing of the aqueous suspension obtaining a filtration cake, said process being characterized by the following steps:

ii) the filtration cake comprising polymer and water in a ratio ranging from 40/60 to 60/40 by weight, preferably in a weight ratio equal to 1:1, is dispersed in a quantity of dimethyl sulfoxide (DMSO) and possibly water which varies from 2 to 6 times the weight of the cake, said DMSO being at a temperature ranging from 5 to 10° C. and with the possible addition of water in a quantity ranging from 0 to 10% by weight with respect to the total weight of DMSO and water;

iii) the dispersion of polymer in water and DMSO obtained in step ii) is subjected to an evaporation step carried out at a temperature ranging from 40 to 80° C., for a time ranging from 3 to 60 minutes, at a pressure ranging from 1.3 to 5.5 KPa.

The filtration cake fed to step ii) is the water/polymer paste collected by the filter, i.e. obtained according to methods known to skilled persons in the field, by filtration on a rotary filter of the aqueous dispersion or slurry coming from the polymerization step, after removal of the unreacted monomers, filtration and washing.

Step iii), in which the dispersion of polymer in water and DMSO obtained at the end of step ii) is subjected to an evaporation step, can be carried out in an apparatus capable of evaporating most of the water together with a certain quantity of solvent, in short times and at reduced temperature and pressure, as described in greater detail hereunder.

Figure 2:
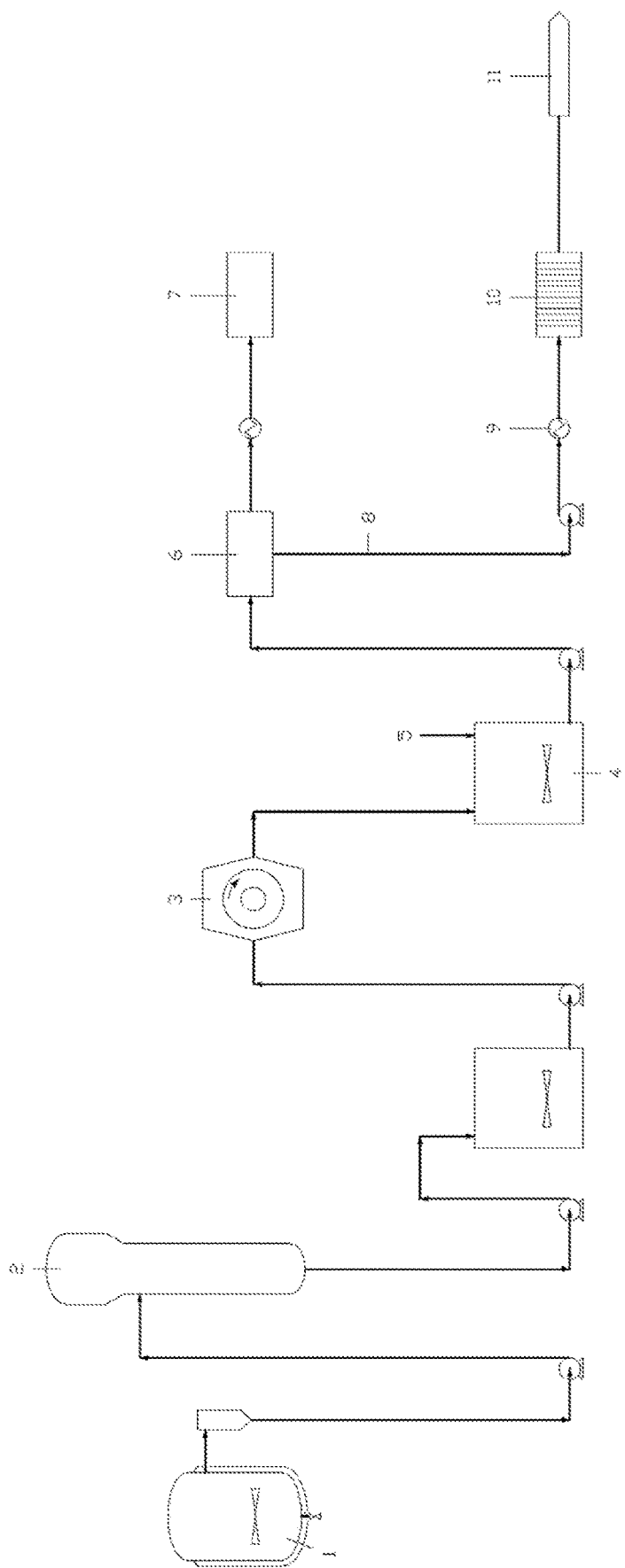
FIG. 2 is an exemplary plant schematic for performing the process of the present invention.

A simplified embodiment of the process, object of the present invention, is schematically described in FIG. 2.

The homogeneous spinning solution obtained at the end of the process according to the present invention is free of gel and undissolved residues and can be fed directly to the spinning line or to a storage tank.

The present invention thus allows a solution of acrylonitrile homopolymers or copolymers to be obtained, free of gel and without the formation of insoluble agglomerates, maintaining the advantages connected with aqueous suspension polymerization, but eliminating the dangerous and costly steps for drying the polymer, transporting the polymer in powder form to storage silos and subsequent re-dissolution in solvent for spinning. The process according to the present invention therefore allows the two polymerization and spinning steps to be integrated in a simplified and economical manner.

Furthermore, step ii), carried out by mixing aqueous DMSO with the wet polymer, allows a particular distribution of the solvent on the polymer to be obtained, which facilitates the intimate imbibition of the powder with the solvent, preventing the formation of conglomerations which are difficult to disperse an solubilize and, at the same time, optimizing the formation of a fine and homogeneous suspension, as disclosed by EP 2894243.

In the present description, the term polymer refers in general to both homopolymers obtained starting from acrylonitrile and also copolymers starting from acrylonitrile and one or more other co-monomers.

In particular, the polymers are high-molecular-weight polymers, with a molecular weight ranging from 80,000 to 200,000 Da, or medium-molecular-weight polymers, with a molecular weight ranging from 40,000 to 55,000 Da.

In the process according to the present invention, the filtration cake fed to step ii) is a paste of polymer and water having a composition ranging from 40/60 to 60/40 by weight of the two components, which is at a temperature ranging from about 50-60° C. A mixture of polymer and water in a ratio of 1:1 is even more preferred.

In step ii) of the process according to the present invention, the DMSO is used at a temperature ranging from 5 to 10° C., preferably equal to 10° C., possibly with the addition of water in a quantity ranging from 0 to 10%, preferably from 2 to 8%, even more preferably from 3 to 7% by weight with respect to the total weight of DMSO and water. The filtration cake is dispersed in a quantity of dimethylsulfoxide (DMSO) and possibly water, which ranges from 2 to 6 times, preferably from 3 to 5 times, the weight of the cake obtained at the end of step i). Under these conditions, the DMSO does not show any solvent characteristics towards the polymer, but, when coming into contact with the solid particles, also within the same polymer granules, it imbues them homogeneously, allowing the dissolution of the solid particles in the subsequent evaporation step iii) (heating and concentration), with the formation of a homogeneous spinning solution, free of undissolved polymer lumps and/or gels difficult to disperse and solubilize.

The evaporation step iii) is carried out at a temperature ranging from 40 to 80° C., preferably from 50 to 70° C., for a time ranging from 3 to 60 minutes, preferably from 10 to 40 minutes, at a pressure ranging from 1.3 to 5.5 KPa, preferably from 1.3 to 2.7 KPa.

As previously indicated, the evaporation step iii) allows most of the water to be evaporated together with a certain quantity of DMSO, in short times and at a reduced temperature and pressure: the combination of temperature, pressure and time conditions within the ranges indicated above, must be such as to ensure that an evaporate equal to 35-70% by weight be obtained from step iii) with respect to the weight of the dispersion reaching step iii) and a homogeneous spinning solution containing from 16 to 25% by weight of polymer, from 1 to 4% by weight of water and from 74 to 80% by weight of DMSO.

The evaporation step of the dispersion/slurry of polymer, water and DMSO can be conveniently carried out in an apparatus suitable for the concentration of the slurry by heating at reduced pressure. Said apparatus can be a thin film evaporator (TFE) or a horizontal polymerizer of the type used for the production of PET (finisher) or a kneader and mixer (knoeder), operating at a temperature ranging from 40 to 80° C. and a pressure ranging from 1.3 to 5.5 KPa.

A further advantage of the process according to the present invention lies in the specific quantity of water contained in the solution which is then fed to the spinning step: the percentage of water present in the preparation process of the homogeneous solution for the production of acrylic fibers according to the present invention, is, in fact, absolutely compatible with the spinning technologies of acrylic fibers either according to the dry or wet spinning technology or with the DJWS (thy jet wet spinning or air gap) technology and it is therefore not necessary to completely remove the water from the solution destined for spinning.

This operation, i.e. the removal of water, can in any case be effected if a water-free homogeneous solution is to be obtained, or with a reduced humidity content.

Furthermore, the presence of small percentages of water in the spinning solutions for acrylic fiber, facilitates the compatibilization of the solution with the coagulation bath, leading to a fiber free from vacuoles and cracks; these characteristics are particularly advantageous in the production of precursors for carbon fibers or textile fibers having a good gloss and compact structure.

The process for the preparation of the homogeneous spinning solution for the production of acrylic fibers according to the present invention preferably comprises the preparation of polymers, such as homopolymers starting from acrylonitrile or copolymers prevalently composed of acrylonitrile (90-99% by weight with respect to the total weight of the polymer) and one or more other co-monomers in a quantity generally ranging from 1 to 10% by weight with respect to the total weight of the polymer.

Preferred co-monomers are neutral vinyl compounds such as methyl acrylate, methyl methacrylate, vinyl acetate, acrylamide and the like, and also compounds containing one or more acid groups such as acrylic acid, itaconic acid, sulfonated styrenes and the like, or other co-monomers capable of conferring various physico-chemical characteristics to the material.

Particular types of acrylic fiber are "precursor" fibers for carbon fiber: these are high-molecular-weight (80,000-200,000 Da) copolymers of acrylonitrile (90-99% by weight with respect to the total weight of the copolymer) and one or more co-monomers, selected from those described above, in a quantity generally ranging from 1 to 5% by weight with respect to the total weight of the copolymer.

The spinning solution or dope thus obtained can be used immediately for feeding an appropriate spinning line or it can be stored in heated tanks.

Figure 1:
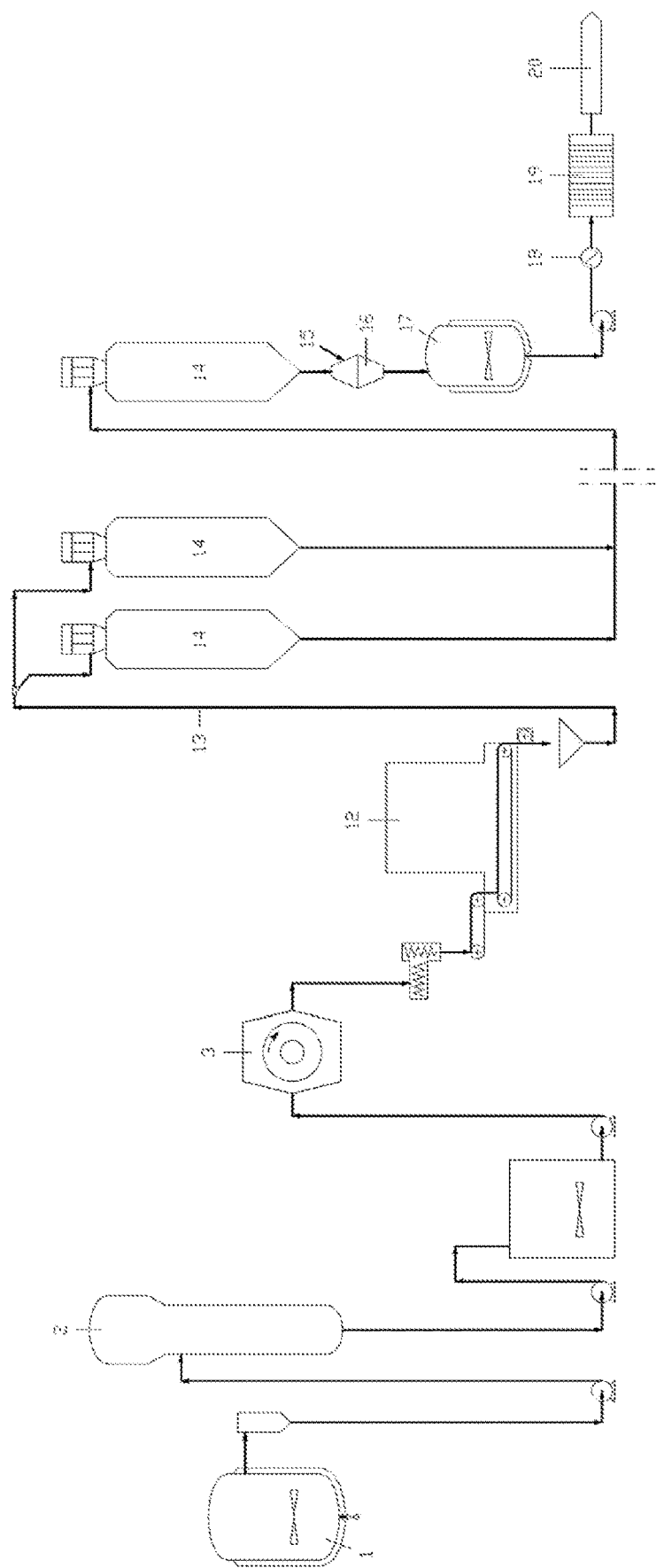
FIG. 1 is a schematic of a process for the preparation of a spinning solution for the production of acrylic fiber according to the state of the art.

As previously indicated, in order to illustrate the process according to the state of the art, reference will be made to the plant scheme described in FIG. 1 in which the polymer coming from the polymerization reactor 1 in the form of slurry in water, after treatment in a stripping column 2 for removing the unreacted monomers, is washed and filtered on a rotary vacuum filter 3. The polymer in powder form is transported to the storage sites 14, through a drying unit 12, generally operating with hot air or nitrogen, and subsequently through line 13. The solvent is fed by means of a screw or other transporting device 15 to a mixing element 16, where the polymer from the storage site 14 also arrives.

In the mixer 16, the polymer in powder form is dispersed in the solvent and the polymer slurry thus obtained is fed to a storage tank 17 and transformed into a spinning solution by means of the exchanger 18. The solution is then sent to a battery of filter presses 19, with selectivity cloths from 40 µm to 5 µm for the removal of any undissolved particles; the dope thus obtained is fed, through line 20, to the spinning line or to a storage tank (not shown in FIG. 1).

In order to illustrate an embodiment of the process according to the present invention, reference is made hereunder to the plant scheme represented in FIG. 2, in which the process can be carried out either in continuous or batchwise, preferably in continuous.

The polymer coming from the polymerization reactor 1 in the form of slurry in water, after treatment in a stripping column 2 for removing the unreacted monomers, is washed and filtered on a rotary vacuum filter 3, resulting in a cake composed of polymer and water which passes from step i) to step ii) of the process according to the present invention. According to the object of step ii) of the process according to the present invention, the cake is then transferred to a stirred tank 4 where the mixture consisting of DMSO and water, maintained at a temperature of 10° C., is fed through line 5. The resulting suspension is kept wider stirring at 10° C. for 15 minutes and then fed to an evaporator 6, operating at a pressure of 15 mmHg with a temperature at the outlet equal to 70° C. for effecting step iii) of the process according to the present invention.

Most of the water and part of the DMSO are recovered through a solvent recovery unit 7, whereas the solution containing polymer, water and DMSO is fed through line 8, in succession to:

a tube-bundle heat exchanger 9;

a static mixer for homogenization (not shown in FIG. 2);

a battery of filter presses with selectivity cloths progressively varying from 40 µm to 5 µm for removing any undissolved particles, indicated with 10.

The homogeneous spinning solution thus obtained is fed, through line 11, to the spinning line or to a storage tank (not shown in FIG. 2).

EXAMPLES

Some embodiments of the process according to the invention are provided hereunder for illustrative but non-limiting purposes.

Example 1

Dissolution of a High-Molecular-Weight Acrylic Copolymer (MW=75,000-100,000) Consisting of Acrylonitrile (96% by Weight with Respect to the Total Weight of the Polymer) and the Pair Methyl Acrylate-Itaconic Acid (4% by Weight with Respect to the Total Weight of the Polymer).

The polymer coming from the polymerization reactor in the form of slurry in water, after treatment in a stripping column for the removal of the unreacted monomers, was washed and filtered on a rotary vacuum filter providing a cake consisting of polymer (57% by weight) and water (43% by weight).

70 kg of this cake were transferred to a stirred tank and 400 kg of a mixture consisting of DMSO (93%) and water (7%) kept at a temperature of 10° C., were added. The resulting suspension was kept under stirring at 10° C. for 15 minutes and then fed to a thin film evaporator (TFE description) operating at a pressure of 15 mmHg, with an outlet temperature equal to 70° C. 254 kg of a liquid consisting of water and DSMO were recovered and condensed, and sent to the solvent recovery unit, and 216 kg of a solution was obtained, containing 40 kg of polymer, 4.2 kg of water and 171.8 kg of DMSO. This solution was then fed, in succession, to:

a tube-bundle heat exchanger;

a static mixer for homogenization;

a battery of filter presses with selectivity cloths progressively varying from 40 µm to 5 µm for removing any undissolved particles.

The dope thus produced is characterized by a viscosity at 70° C. of 320 poises. The viscosity was measured by means of a rotational "ROTOVISCO" Haake viscometer with a MCV2 rotor and a thermostated cell.

The quality of the spinning solution obtained is determined by the absence of impurities such as undissolved polymer particles and gels. These impurities thicken on the holes of the spinneret, jeopardizing the quality of the fiber produced.

The method for determining the quality of the spinning solution is the filterability test.

The test consists in determining the clogging rate on standard cloth (SEFAR-Nytal 5 µm) of the dope under examination.

In practice, the filterability test is carried out in equipment comprising (see FIG. 3):

a preparation tank of the slurry or storage tank of the dope (3') with a thermostat-regulating jacket (4');

a dosage gear pump (6');

a jacketed tube heat-exchanger (7') fed with a glycol/water solution (length 1,400 mm, volume 90 ml)

a jacketed tube heat-exchanger (8') fed with water at 50° C. for the thermostat-regulation of the dope;

a manometer (9');

a filter block (10') (SEFAR-Nytal 5 µm cloth).

Figure 3:
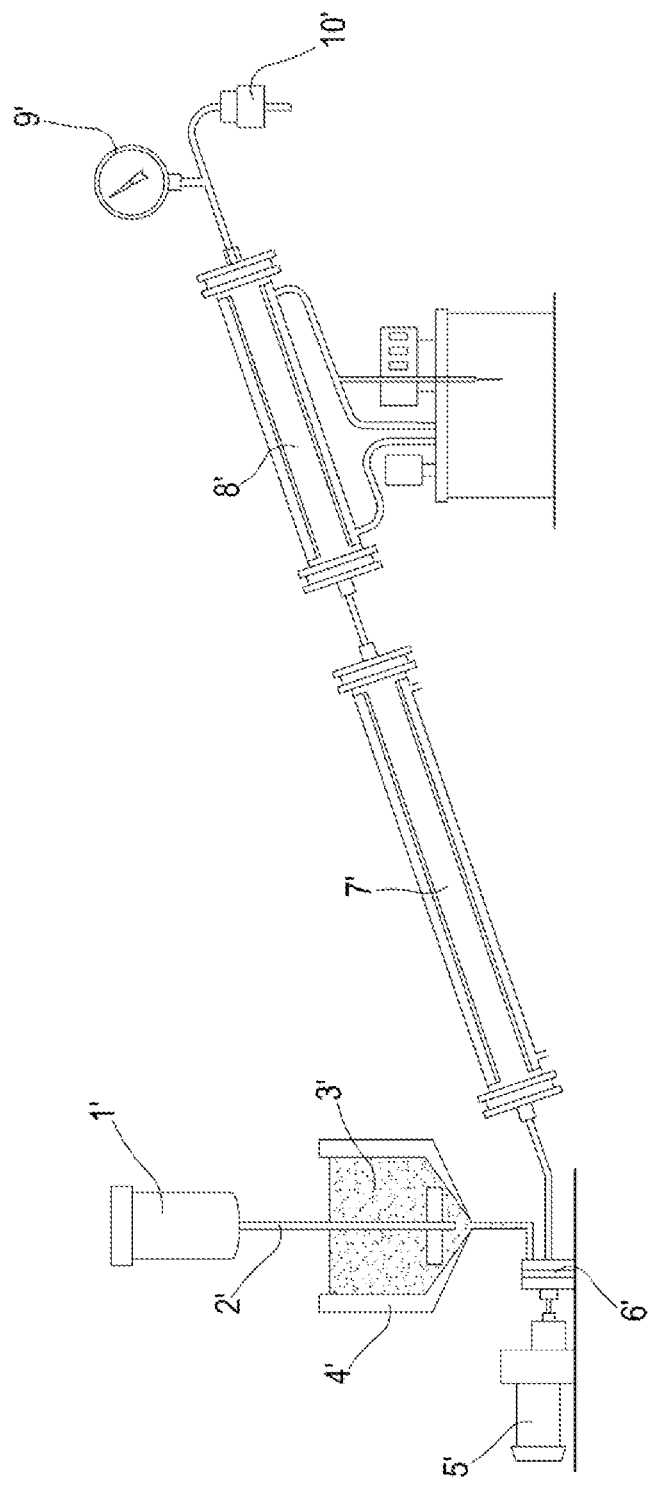
FIG. 3 depicts equipment used to conduct a filterability test of a spinning solution produced by the present invention.

FIG. 3 also indicates the motor with 1', the stirrer with 2' and the motor of the dosage pump equipped with a servo-adapter of the "stober" type, with 5'.

The spinning solution was fed to the tank 3' and then heated by means of a glycol/water mixture to 70° C. through the exchanger 7' with a flow-rate of the pump of 27 cc/min (residence time 3.3 min). The dope was then cooled to 50° C. by means of the exchanger connected to the thermostatic water bath 8'. The cooled dope then passed through the filter block where the pressure was detected by means of the manometer. The clogging rate of the filter was evaluated by means of the pressure increase as ΔP in ate/h.

In the present example, the increase in ΔP in the control equipment proved to be equal to 0.4 ate/h. This increase in pressure corresponds, in an industrial situation, to correct operating conditions of the line; this value, in fact, provides a blockage of the system due to clogging of the filter press with cloths of 5 μm, after 150 h (6.25 days); a value of 150 hours is therefore a guarantee index of spinning continuity under optimum conditions.

The solution of polymer in solvent thus obtained was fed to a spinning line for precursors of carbon fibers.

During the spinning process, the spinnerets, immersed in a coagulation bath consisting of a mixture of water and DMSO, generated a perfectly round, compact fiber, free of cracks. The fiber thus obtained was washed with deionized water to remove the residual solvent, stretched in various steps in boiling water for about 8 times the initial length, dried on hot rollers and collected in reels. The tows obtained are composed of fibers with a diameter of about 12 microns (equal to a titer of about 1 dtex), an average tenacity of 60 cN/Tex and an ultimate elongation of about 15%, measured on an Instron 5542 10N-cell dynamometer according to the method ASTM D-3822, proving to be suitable for being transformed into carbon fiber.

Example 2

Dissolution of a Medium-Molecular-Weight Acrylic Copolymer ($MW_n$=40,000-55,000) for Textile Use, Composed of Acrylonitrile and Vinyl Acetate (93/7 by Weight with Respect to the Total Weight of the Polymer).

The polymer coming from the polymerization reactor in the form of slurry in water, after treatment in a stripping column for the removal of the unreacted monomers, was washed and filtered on a rotary vacuum filter providing a cake consisting of polymer (49% by weight) and water (51% by weight).

100 kg of this cake were transferred to a stirred tank and 300 kg of a mixture consisting of DMSO (93%) and water (7%) kept at a temperature of 10° C., were added. The resulting suspension was kept under stirring at 10° C. for 15 minutes and then fed to a thin film evaporator operating at a pressure of 15 mmHg, with an outlet temperature equal to 70° C. 167 kg of a vapour composed of water and DSMO were recovered, which, after condensation, was sent to the solvent recovery unit; 233 kg of a solution was obtained, containing 49 kg of polymer, 5.8 kg of water and 178.2 kg of DMSO.

The dope thus produced is characterized by a viscosity at 70° C. of about 280 poises.

The spinning solution obtained is free of impurities such as undissolved polymer particles and gels.

The method used for measuring the viscosity is the same as that indicated in Example 1 and the method for determining the quality of the spinning solution is the filterability test, as described in Example 1.

In this example, the increase in ΔP in the test effected in the equipment of FIG. 3 proved to be equal to 0.25 ate/h. This increase in pressure corresponds to the complete clogging of the filter press with cloths of 5 μm every 272 hours, equal to 11.3 days, an acceptable value from an operational point of view of the production line.

The solution of polymer in solvent thus produced was fed to a spinning line for textile fibers; the spinnerets, immersed in a coagulation bath consisting of a mixture of water/solvent, generate fibers free of cracks. The fibers were washed in deionized water, stretched for about 5 times the initial length, dried on hot rollers and curled in a crimping machine. The strips of fiber collected in tows (bundles of fibers) of about 110 g/m (Ktex) were steamed to obtain fibers with a denier of 3.3 dtex, a toughness equal to about 28 cN/tex and an ultimate elongation equal to about 35%, measured on an Instron 5542 10N-cell dynamometer according to the method ASTM D-3822. A fiber with these characteristics proved to be suitable for being transformed into manufactured articles with textile cycles typical of acrylic fiber.

Table 1 hereunder indicates the numerical data for three further production tests of a spinning solution, carried out according to the process described in Example 1.

| | Cake | | Solvent | | Total | Dope produced | | | Evaporate | |
|---|---|---|---|---|---|---|---|---|---|---|
| Test | Polymer kg | Water kg | DMSO kg | Water kg | weight kg | Polymer kg | Water kg | DMSO kg | Water kg | DMSO kg |
| 3 | 200 | 150 | 1860 | 140 | 2350 | 200 | 12 | 1058 | 278 | 802 |
| | 57.1% | 42.9% | 93.0% | 7% | | 15.7% | 0.9% | 83.3% | 25.7% | 74.3% |
| 4 | 200 | 185 | 1400 | 100 | 1885 | 200 | 40 | 960 | 245 | 440 |
| | 51.9% | 8.1% | 93.3% | 6.7% | | 16.7% | 3.3% | 80.0% | 35.8% | 64.2% |
| 5 | 200 | 210 | 1900 | 100 | 2410 | 200 | 40 | 830 | 270 | 1070 |
| | 48.8% | 51.2% | 95.0% | 5% | | 18.7% | 3.7% | 77.6% | 20.1% | 79.9% |

The invention claimed is:

1. A process for the preparation of a homogeneous spinning solution for the production of acrylic fibers, comprising:
   i) preparing an aqueous suspension of a homopolymer or copolymer of acrylonitrile by polymerizing monomers in an aqueous suspension, removing the unreacted monomers, filtering and washing the aqueous suspension, and obtaining a filtration cake comprising the homopolymer or copolymer of acrylonitrile and water in a ratio of from 40:60 to 60:40 by weight;
   ii) dispersing the filtration cake in a quantity of dimethyl sulfoxide (DMSO) and optionally water which varies from 2 to 6 times the weight of the filtration cake to produce a dispersion, said DMSO being at a temperature ranging from 5 to 10° C. and with the optional water being in a quantity ranging from 0 to 10% by weight with respect to the total weight of DMSO and optional water;

iii) evaporating the dispersion obtained in step ii) at a temperature ranging from 40 to 80° C. for a time ranging from 3 to 60 minutes at a pressure ranging from 1.3 to 5.5 kPa.

2. The process according to claim 1, wherein the homopolymer or copolymer of acrylonitrile has a molecular weight ranging from 40,000 to 55,000 Da.

3. The process according to claim 1, wherein the homopolymer or copolymer of acrylonitrile has a molecular weight ranging from 80,000 to 200,000 Da.

4. The process according to claim 1, wherein the copolymer of acrylonitrile comprises acrylonitrile in a quantity ranging from 90 to 99% by weight with respect to the total weight of the copolymer and one or more comonomers in a quantity ranging from 1 to 10% by weight with respect to the total weight of the copolymer.

5. The process according to claim 4, wherein the one or more comonomers are selected from the group consisting of neutral vinyl compounds, compounds containing one or more acid groups, and combinations thereof.

6. The process according to claim 5 wherein the neutral vinyl compounds are selected from the group consisting of methyl acrylate, methyl methylacrylate, vinyl acetate, acrylamide, and combinations thereof.

7. The process according to claim 5 wherein the compounds containing one or more acid groups are selected from the group consisting of acrylic acid, itaconic acid, sulfonated styrenes, and combinations thereof.

8. The process according to claim 1, wherein in step ii), the filtration cake is dispersed in a quantity of DMSO and optionally water varying from 3 to 5 times the weight of the cake.

9. The process according to claim 1, wherein the filtration cake dispersed in step ii) comprises the homopolymer or copolymer of acrylonitrile and water in a weight ratio of 1:1.

10. The process according to claim 1, wherein the filtration cake dispersed in step ii) is a paste of the homopolymer or copolymer of acrylonitrile and water at a temperature of 50-60° C.

11. The process according to claim 10, wherein the paste comprises the homopolymer or copolymer of acrylonitrile and water in a weight ratio of 1:1.

12. The process according to claim 1, wherein in step ii), the DMSO is at a temperature of 10° C.

13. The process according to claim 1, wherein in step ii) the optional water is added to the DMSO in a quantity ranging from 2 to 8% by weight with respect to the total weight of DMSO and optional water.

14. The process according to claim 13, wherein in step ii) the optional water is from 3 to 7% by weight with respect to the total weight of DMSO and optional water.

15. The process according to claim 1, wherein step iii) is carried out at a temperature of from 50 to 70° C.

16. The process according to claim 1, wherein step iii) is carried out at a pressure of from 1.3 to 2.7 kPa.

17. The process according to claim 1, wherein step iii) is carried out for a time of from 10 to 40 minutes.

18. The process according to claim 1, wherein an evaporate equal to 35-70% by weight with respect to the weight of the dispersion provided to step iii) is obtained from the evaporation step iii), together with a homogeneous spinning solution comprising from 16 to 25% by weight of the homopolymer or copolymer of acrylonitrile, from 1 to 4% by weight of water and from 74 to 80% by weight of DMSO.

* * * * *